(12) United States Patent
Brault et al.

(10) Patent No.: US 8,529,208 B2
(45) Date of Patent: Sep. 10, 2013

(54) ROTARY ASSEMBLY FOR A TURBOMACHINE FAN

(75) Inventors: Michel Gilbert Roland Brault, Quincy sous Senart (FR); Stephane Rousselin, Hericy (FR)

(73) Assignee: Snecma, Paris (FR)

( * ) Notice: Subject to any disclaimer, the term of this patent is extended or adjusted under 35 U.S.C. 154(b) by 1179 days.

(21) Appl. No.: 12/052,108

(22) Filed: Mar. 20, 2008

(65) Prior Publication Data

US 2008/0232969 A1 Sep. 25, 2008

(30) Foreign Application Priority Data

Mar. 21, 2007 (FR) ...................................... 07 53958

(51) Int. Cl.
*F01D 5/22* (2006.01)

(52) U.S. Cl.
USPC .................... 416/191; 416/193 R; 416/193 A; 416/220 R

(58) Field of Classification Search
USPC ............. 416/193 A, 191, 193 R, 196 R, 190, 416/220 R
See application file for complete search history.

(56) References Cited

U.S. PATENT DOCUMENTS

| | | | |
|---|---|---|---|
| 2,669,383 A * | 2/1954 | Purvis et al. ............... | 416/219 R |
| 2,749,028 A | 6/1956 | Stalker et al. | |
| 4,019,832 A * | 4/1977 | Salemme et al. ......... | 416/193 A |
| 4,655,687 A | 4/1987 | Atkinson | |
| 4,802,824 A * | 2/1989 | Gastebois et al. ........ | 416/193 A |
| 5,244,345 A * | 9/1993 | Curtis ....................... | 416/193 A |
| 5,281,096 A | 1/1994 | Harris et al. | |
| 5,466,125 A | 11/1995 | Knott | |
| 6,217,283 B1 | 4/2001 | Ravenhall et al. | |
| 6,622,475 B2 | 9/2003 | Brault et al. | |
| 6,655,920 B2 | 12/2003 | Beutin et al. | |
| 6,938,407 B2 | 9/2005 | Beutin et al. | |
| 7,008,190 B2 | 3/2006 | Brault et al. | |
| 7,195,444 B2 | 3/2007 | Brault et al. | |
| 7,364,402 B2 | 4/2008 | Brault et al. | |
| 7,762,781 B1 * | 7/2010 | Brown et al. ............. | 416/193 A |
| 7,931,442 B1 * | 4/2011 | Liang ........................ | 416/193 A |
| 2006/0245925 A1 | 11/2006 | Brault et al. | |
| 2007/0006569 A1 | 1/2007 | Brault et al. | |
| 2008/0112805 A1 | 5/2008 | Brault et al. | |

FOREIGN PATENT DOCUMENTS

| | | |
|---|---|---|
| DE | 199 40 556 A1 | 3/2001 |
| EP | 1 306 523 A1 | 5/2003 |
| GB | 2 049 068 A | 12/1980 |
| GB | 2 251 897 A | 7/1992 |

* cited by examiner

*Primary Examiner* — Christopher Verdier
(74) *Attorney, Agent, or Firm* — Oblon, Spivak, McClelland, Maier & Neustadt, L.L.P.

(57) ABSTRACT

A rotary assembly for a turbomachine fan includes a disk rotatable about an axis; a plurality of blades fastened by their roots to the disk and extending radially outwards from the disk; and a plurality of inter-blade platforms, each extending between two adjacent blades and defining the inner profile for the flow section of the fluid passing through the fan. On their facing side faces, these adjacent blades present slides between which the platform can slide, these slides limiting outward radial movement of the platform.

13 Claims, 3 Drawing Sheets

ROTARY ASSEMBLY FOR A TURBOMACHINE FAN

The invention relates to a rotary assembly for a turbomachine fan. It can be applied to any type of turbomachine, whether terrestrial or for aviation, and more particularly it can be applied to airplane turbojets.

BACKGROUND OF THE INVENTION

More precisely, the invention relates to a rotary assembly for a fan, the assembly of the type comprising: a disk rotatable about an axis; a plurality of blades fastened by their roots to said disk and extending radially outwards from said disk; and a plurality of inter-blade platforms, each extending between two adjacent blades and defining the inner profile of the flow section for the fluid passing through the fan.

In the present application, "upstream" and "downstream" are defined relative to the normal direction of fluid flow through the turbomachine (from upstream to downstream). Furthermore, the axial direction corresponds to the direction of the axis of rotation A of the fan disk, and a radial direction is a direction perpendicular to the axis A. Finally, unless specified to the contrary, the adjectives "inner" and "outer" are used relative to a radial direction, such that an inner portion (i.e. a radially inner portion) of an element is closer to the axis A than is an outer portion of the same element (i.e. a radially outer portion).

It should be clear that the inter-blade platforms to which the invention applies are "fitted" platforms, i.e. platforms that are constituted by elements distinct from the other elements of the rotary assembly and that are assembled thereto. In particular, they do not form integral portions of the blades and they are therefore not so-called "integrated" platforms.

Whenever possible, turbomachine designers prefer to use "fitted" platforms instead of "integrated" platforms because fitted platforms present the following advantages:
  they enable the design of the blades of the fan to be simplified;
  in the event of a blade breaking, "fitted" platforms are not tied to the blade fragments, and debris is therefore reduced in size. Thus, the casing situated outside the blades (referred to as a retention casing) does not require a debris trap (where a debris trap is a cavity that serves in the event of rupture to receive a blade and its "integrated" platform so as to avoid damaging the other blades); and
  it is possible to make the platforms out of a material that is different from that used for the blades. Platforms are thus generally made of composite material, while blades are made of metal alloy.

Naturally, "integrated" platforms need to be retained since otherwise they would move outwards radially away from the disk of the rotary assembly under the effect of centrifugal forces.

Rotary assemblies for fans having "fitted" platforms of the above-specified type are described in the following documents: U.S. Pat. No. 4,655,687; U.S. Pat. No. 5,466,125; U.S. Pat. No. 5,281,096; and U.S. Pat. No. 6,217,283 B1.

Document U.S. Pat. No. 4,655,687 describes a rotary assembly in which each inter-blade platform presents a plurality of tabs extending radially towards the disk. These tabs are terminated by hooks that engage with other hooks formed on the outer surface of the disk. That hook system serves to retain each platform in the radial direction by opposing the centrifugal force acting on the platform when it is in rotation. That system presents a high fabrication cost because of the cost of fabricating said tabs and the cost of machining said hooks.

Document U.S. Pat. No. 5,466,125 describes a rotary assembly in which each inter-blade platform presents a tab extending radially towards the disk and terminated by a dovetail tenon. That tenon is assembled in a mortise machined in the disk. A wedge needs to be inserted between the mortise and the tenon. That system suffers from the drawbacks of high fabrication costs and of being difficult to assemble, in particular because of said wedge.

Documents U.S. Pat. No. 5,281,096 and U.S. Pat. No. 6,217,283 B1 describe rotary assemblies in which two annular flanges are provided respectively upstream and downstream of the inter-blade platform. The flanges are fastened to the fan disk by bolting. Those fans overlap the upstream and downstream edges of the platform in order to limit the axial movement of each platform and retain the platform in the radial direction.

Those flanges are thus fastened sufficiently strongly to the disk and are themselves sufficiently strong to oppose the centrifugal radial forces acting on the platform while it is in rotation. Such flanges are therefore generally expensive to fabricate. In addition, mounting the flanges is made complex by the fact that each flange (upstream or downstream) must overlap the outsides of the (upstream or downstream) edges of all of the platforms, and by the fact that each flange needs to be fastened to the disk strongly.

OBJECTS AND SUMMARY OF THE INVENTION

An object of the invention is to propose a rotary assembly of the above-specified type with a system for retaining the platforms in the radial direction, that constitutes an alternative to systems of the prior art, and that is easy to assemble.

To achieve this object, the invention provides a rotary assembly for a turbomachine fan, the assembly comprising: a rotary assembly for a turbomachine fan comprises a disk rotatable about an axis; a plurality of blades fastened by their roots to said disk and extending radially outwards from said disk; and a plurality of inter-blade platforms, each extending between two adjacent blades and defining the inner profile of the flow section for the fluid passing through the fan; and wherein said adjacent blades present slides between which said platform can slide, these slides limiting outward radial movement of said platform.

More precisely, said slides are used to guide said platform in sliding and they form abutments for each platform, so as to retain it by opposing the centrifugal radial forces (outwardly directed forces) acting on said platform when the fan is rotating.

It should be observed that the fact that the slides limit outward radial movement of the platform, does not necessarily mean that they prevent all radial movement of the platform. Thus, the invention also covers rotary assemblies in which the platform presents radial play.

The rotary assembly of the invention has the advantage of being simple to assemble because the platforms are mounted by sliding between the blades and because the number of parts making up the assembly remains limited.

In a particular embodiment, the rotary assembly of the invention has flanges against which the upstream and downstream edges of said platform come into abutment, so as to limit the axial movement of said platform.

Unlike the flanges of U.S. Pat. No. 5,281,096 and U.S. Pat. No. 6,217,283 B1, these flanges do not act to oppose the centrifugal radial forces acting on the platforms, since this function is provided by the slides. As a result, the flanges do not need to overlap the outsides of the platforms, thus making it possible for the flanges to be smaller and lighter in weight, and for the flanges to be simpler to mount.

The compactness of the inter-blade platforms and of said flanges makes the position particularly suitable for engines of small size (e.g. engines having a fan diameter of less than 40 inches, i.e. about 1 meter).

BRIEF DESCRIPTION OF THE DRAWINGS

The invention and its advantages can be better understood on reading the following detailed description of embodiments of the invention. This description refers to the accompanying figures, in which.

MORE DETAILED DESCRIPTION

Figure 2:
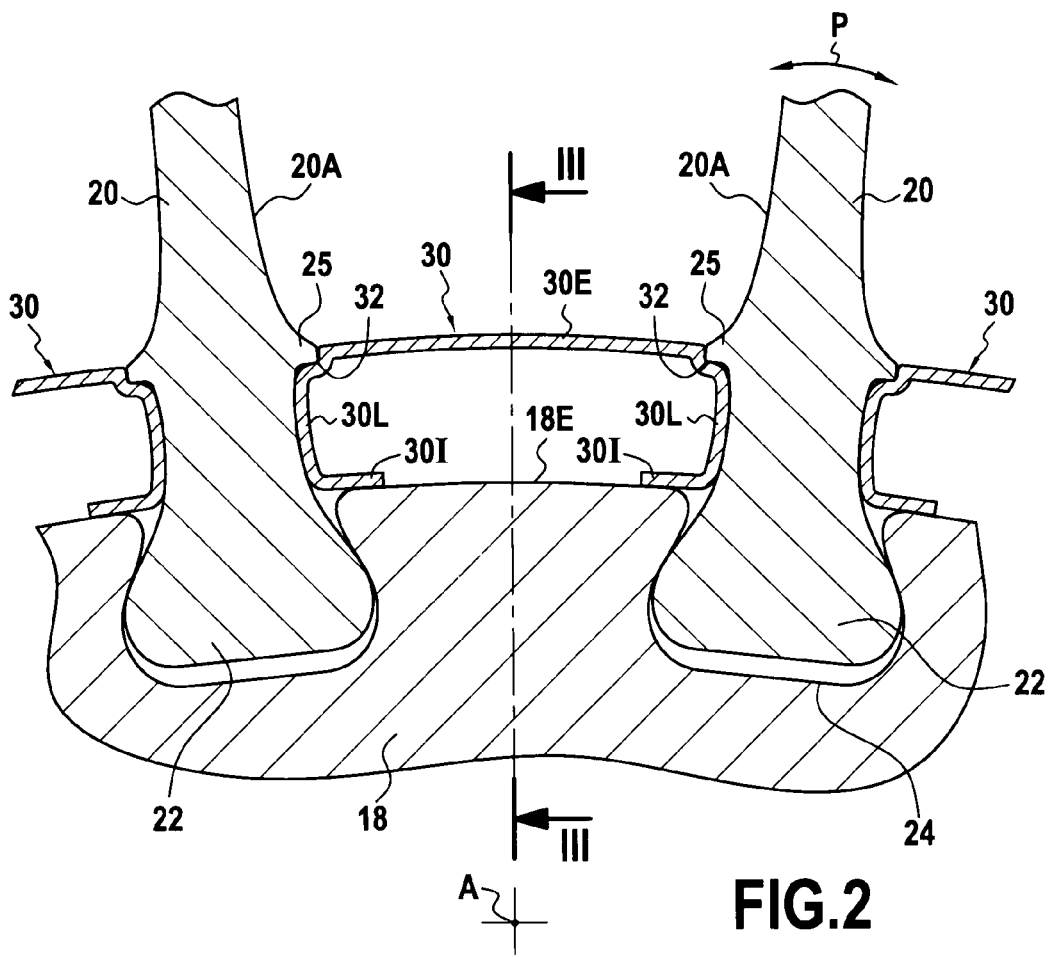
FIG. 2 is a section view on plane II-II (perpendicular to the axis A) of FIG. 1 and showing a fragment of an example of a rotary assembly of the invention, in the zone where an inter-blade platform is assembled.
Figure 4:
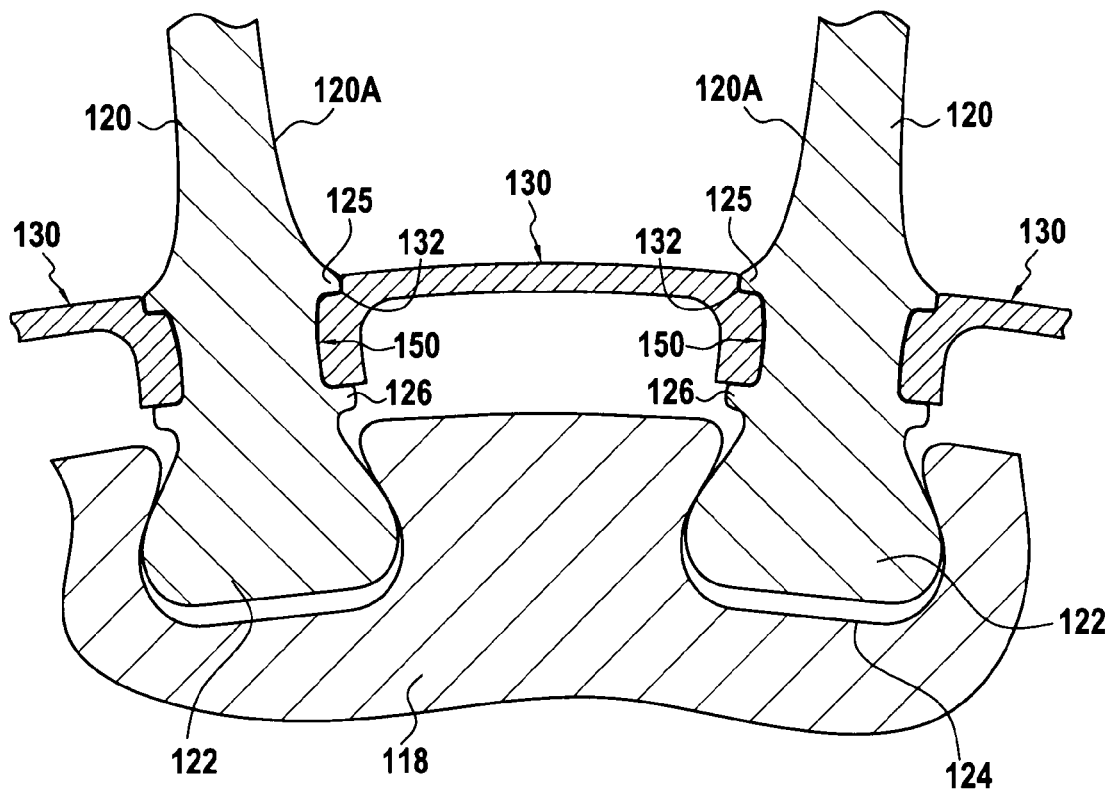
FIGS. 4 and 5 are views analogous to FIG. 2 showing other examples of rotary assemblies of the invention.
Figure 5:
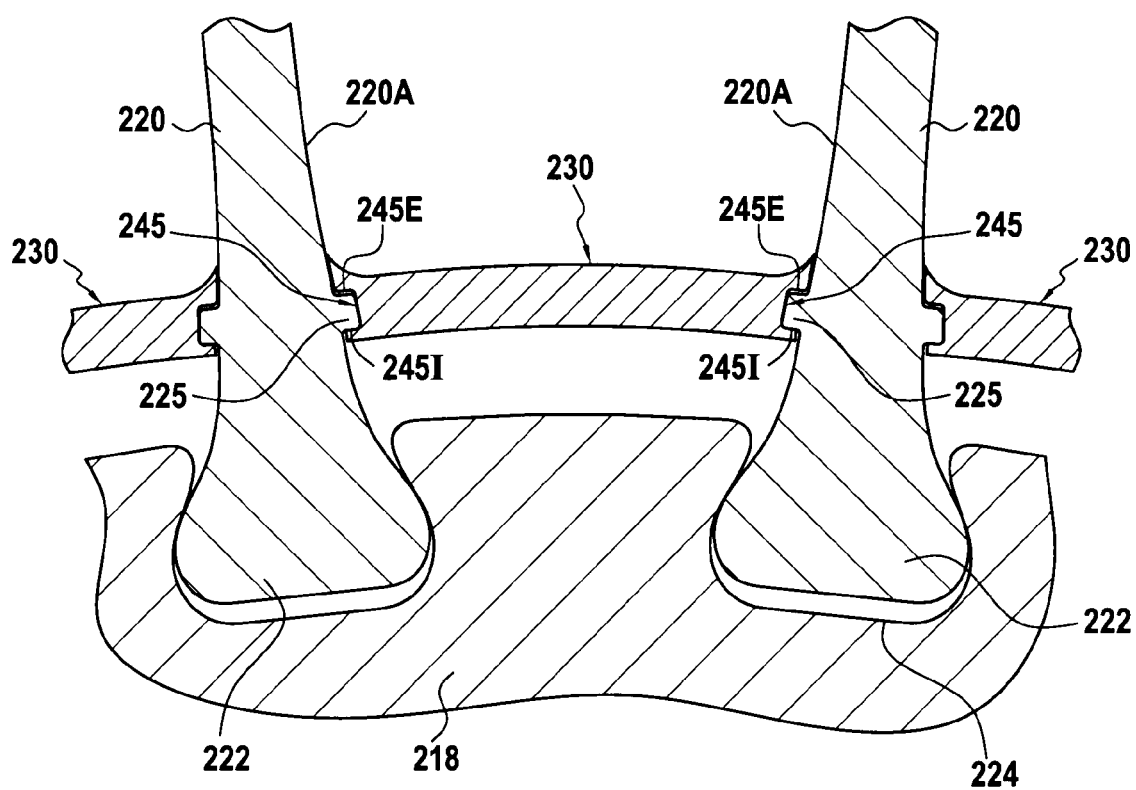

Elements that are analogous between FIG. 2 and FIGS. 4 and 5 are identified by the same numerical references, respectively plus 100 and plus 200.

Figure 1:
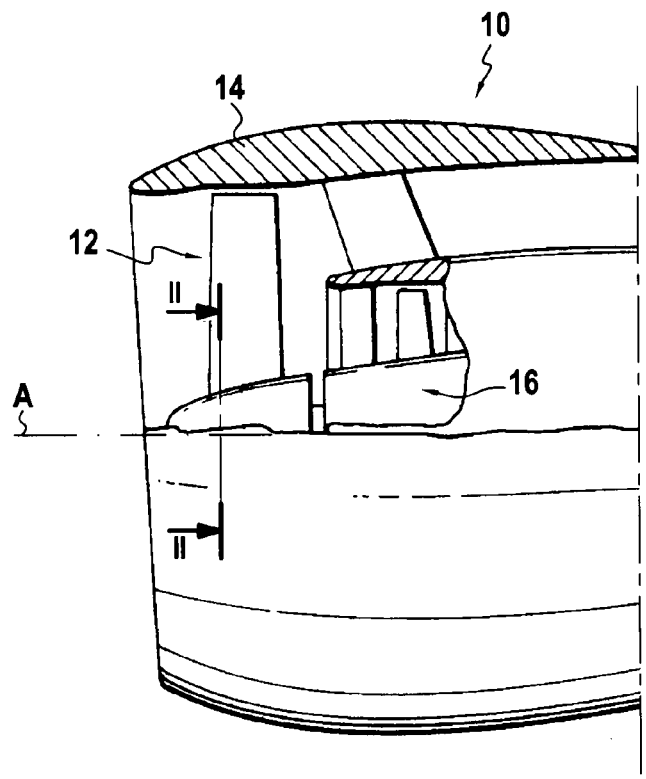
FIG. 1 is a diagram showing the upstream portion of an example of an airplane turbojet.

FIG. 1 shows the upstream portion of a two-spool bypass turbojet 10 for an airplane. This upstream portion comprises a fan 12 surrounded by an outer casing 14. Downstream from the fan 12 there is a low-pressure compressor 16 or "booster" of the turbojet.

Figure 3:
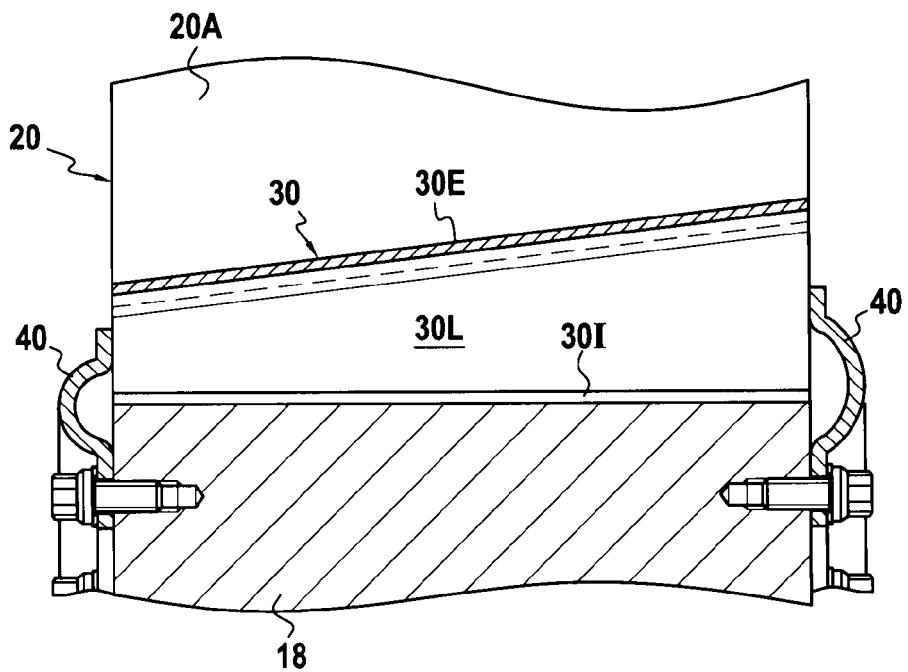
FIG. 3 is a section view on radial plane III-III of FIG. 2.

The fan 12 includes a rotary assembly of the invention, an example of which is shown in FIGS. 2 and 3.

This rotary assembly comprises a disk 18 rotatable about an axis A corresponding to the axis of rotation of the turbojet. At the periphery of the disk 18 there are mounted blades 20 that move in rotation with the disk 18 and that are regularly spaced apart from one another.

Each blade 20 is fastened to the disk 18 via its root 22, which is in the form of a dovetail tenon and which is received in a mortise 24 provided for this purpose in the outside surface 18E of the disk 18. The blade roots 22 are mounted with a small amount of clearance in the mortises 24, so as to allow the blades 20 to pivot a little relative to the disk 18, in the circumferential direction of the disk. This small amount of pivoting P is symbolized by a double-headed arrow in FIG. 2.

An inter-blade platform 30 extends between each pair of adjacent blades 20. The platforms 30 perform numerous functions, and in particular the following: defining an aerodynamic inside profile for the fluid flow section passing through the fan; limiting the pivoting P of the blades 20; and protecting the disk 18 against projectiles that might pass through the fan.

It should be observed that the flow section for the fluid passing through a turbomachine can be defined as being the envelope of the space in which said fluid flows. In the fan 12, the profile (or shape) of this section is defined on the inside by the platforms 30 and on the outside by the fan casing 14.

The platforms 30 are preferably made of a material that is lighter than the material constituting the blade 20. For example, the platforms 30 could be made of composite material, while the blades 20 are made of a metal alloy.

In accordance with the invention, two adjacent blades 20 present slides 25 on their facing side faces 20A, between which slides the platforms 30 can slide. In the embodiments shown, the slides 25 project from the remainder of the side faces 20A. In other embodiments (not shown), the slides 25 are set back relative to the remainder of the side faces 20A.

The slides 25 and the outside surface 18E of the rotary disk 18 define between them a housing within which the platform 30 can slide. In the embodiment shown, the radial sections (i.e. the section in the plane of FIG. 2) of the outline of the platform 30 and of the outline of said housing are complementary in shape.

The platform 30 is cylindrical and of C-shaped section. The platform 30 is thus hollow, thereby enabling its weight to be limited. It comprises an outer wall 30E, two side walls 30L, and two inner walls 30I extending the side walls 30L and folded towards the middle of the platform. The outer wall 30E and the inner walls 30I extend in a circumferential direction relative to the disk 18, while the side walls 30L extend rather in a radial direction. The fact that the inner walls 30I do not meet and form a continuous inner wall, imparts better flexibility to the platform 30 in the circumferential direction.

In a particular embodiment of the invention, the platform 30 presents grooves 32 extending along its side faces, each groove 32 housing a slide 25, at least in part.

More precisely, the grooves 32 are situated at the intersections between the side faces and the outside face of the platform 30, i.e. at the intersections between the outside wall 30E and the side walls 30L, and each groove 32 houses part of a slide 25.

Each groove 32 houses the inner portion of a slide 25, such that the outside surface of the platform 30 extends the outside surfaces of the slides 25. This serves to provide outside surface continuity between the slides 25 and the platform 30 in order to define the best possible aerodynamic profile for the flow section of the fluid passing through the fan.

The extent to which the platform 30 can be moved radially outwards is limited (here prevented) by the slides 25, against which the outside face of the platform comes into abutment. More precisely, it is the walls of the grooves 32 that come into abutment against the slides 25.

Furthermore, the radial inward movement of the platform 30 is limited (here it is prevented) by the outer surface 18E of the rotary disk 18 against which the inner face of the platform 30 comes into abutment. More precisely, it is the inner walls 30I that come into abutment against the outer surface 18E.

As for axial movement (along the axis A) of the platform 30, the upstream and downstream edges thereof come into abutment against flanges 40 shown in FIG. 3. In this embodiment, these flanges 40 are annular and thus engage all of the platforms 30 on the disk 18. The flanges 40 are fastened onto the disk 18 by bolting, screw-fastening, or any other appropriate means.

It should be observed that the flanges 40 do not overlap the outside of the platform 30. In other words, the flanges 40 do not make contact with the outer wall 30E of the platform 30. The flanges come into contact solely with the upstream and downstream edges of the platform. Thus, assembling the flanges is an operation that is simple.

With reference to FIG. 4, there follows a description of another embodiment of the rotary assembly of the invention.

In this embodiment, each of the side faces 120A facing two adjacent blades 120 carries an outer slide 125 and an inner slide 126. Thus, between two adjacent blades 120 there are four slides: two outer slides 125 and two inner slides 126.

The two outer slides 125 limit radially outward movement of the platform 130. These slides 125 thus have the same function as the slides 25 in the embodiment of FIG. 2. Furthermore, the platform 130 presents grooves 132 analogous to the grooves 32, serving to receive the bottom portions of the slides 125, such that the outer face of the platform 130 extends the outer faces of the slides 125.

The two inner slides 126 serve to limit (here prevent) radially inward movement of the platform 130.

In other words, if consideration is given to the one of the blades 120, the outer and inner slides 125 and 126 define between them a groove 150 within which at least a portion of a side wall of the platform 130 can slide.

FIG. 5 shows another embodiment of a rotary assembly of the invention. In this embodiment, the adjacent blades 220 present on each of their facing side faces 220A a respective slide 225 that projects. Furthermore, the platform 230 presents grooves 245 extending along its side faces, and each groove 245 receives one of the slides 125 in full.

Thus, when the platform 230 tends to move radially outwards, the inner wall 245I of the groove 245 comes into abutment against the slide 225. Furthermore, when the platform 230 tends to move radially inwards, the outer wall 245E of the groove 245 comes into abutment against the slide 225. Thus, the slide 225 serves to limit radial movement of the platform 230 both inwards and outwards.

What is claimed is:

1. A rotary assembly for a turbomachine fan, the assembly comprising:
    a disk rotatable about an axis;
    a plurality of blades, each blade having a root, each root being fastened to said disk, and each blade extending radially outwards from said disk; and
    a plurality of inter-blade platforms, each extending between two adjacent blades and defining an inner profile of a flow section for a fluid passing through the fan;
    wherein said adjacent blades present slides on their facing side faces, these slides being situated outside the disk and limiting outward radial movement of said platform,
    wherein each of said platforms is a one-piece cylindrical element consisting entirely of a C-shaped section and comprises:
        an outer wall extending in a circumferential direction relative to the disk, the outer wall defining the inner profile of the flow section for the fluid passing through the fan,
        two side walls extending substantially in a radial direction, and
        two inner walls extending the side walls and being folded towards the middle of the platform, said inner walls extending in a circumferential direction relative to the disk without meeting each other, and
    wherein the inner walls rest on an outermost surface of the disk.

2. The rotary assembly according to claim 1, including flanges against which the upstream and downstream edges of said platform come into abutment, so as to limit axial movement of said platform.

3. The rotary assembly according to claim 1, wherein said slides project.

4. The rotary assembly according to claim 1, wherein inward radial movement of said platform is limited by the outermost surface of the disk.

5. The rotary assembly according to claim 4, wherein said slides and the outermost surface of the rotary disk define between them a housing within which said platform can slide, and wherein, in radial section, the outline of the platform and the outline of said housing present shapes that are complementary.

6. The rotary assembly according to claim 1, wherein each of said facing side faces carries an outer slide and an inner slide, the two outer slides limiting outward radial movement of said platform, and the two inner slides limiting inward radial movement of said platform.

7. The rotary assembly according to claim 1, wherein said platform presents grooves extending along its side faces, each groove housing a slide, at least in part.

8. The rotary assembly according to claim 7, wherein said grooves are situated at the intersections between the side faces and the outer face of said platform, said grooves housing the inner portions of the slides such that the outer face of said platform extends the outer faces of the slides.

9. The rotary assembly according to claim 1, wherein the outer wall, the side walls, and the inner walls each include an inner surface and an outer surface opposite the inner surface, and the outer surfaces of the inner walls abut the outermost surface of the disk.

10. The rotary assembly according to claim 9, wherein the inner surfaces of the side walls face each other, and the outer surfaces of the side walls abut the facing side faces of the adjacent blades.

11. The rotary assembly according to claim 9, wherein the inner surface of the outer wall faces the inner surfaces of the inner walls.

12. A turbomachine fan including a rotary assembly, said rotary assembly comprising:
    a disk rotatable about an axis;
    a plurality of blades, each blade having a root, each root being fastened to said disk, and each blade extending radially outwards from said disk; and
    a plurality of inter-blade platforms, each extending between two adjacent blades and defining an inner profile of a flow section for a fluid passing through the fan;
    wherein said adjacent blades present slides on their facing side faces, these slides being situated outside the disk and limiting outward radial movement of said platform, and
    wherein each of said platforms is a one-piece cylindrical element consisting entirely of a C-shaped section and comprises:
        an outer wall extending in a circumferential direction relative to the disk, the outer wall defining the inner profile of the flow section for the fluid passing through the fan,
        two side walls extending substantially in a radial direction, and
        two inner walls extending the side walls and being folded towards the middle of the platform, said inner walls extending in a circumferential direction relative to the disk without meeting each other, and
    wherein the inner walls rest on an outermost surface of the disk.

13. A turbomachine including a fan, said fan including a rotary assembly, said rotary assembly comprising:
    a disk rotatable about an axis;
    a plurality of blades, each blade having a root, each root being fastened to said disk, and each blade extending radially outwards from said disk; and
    a plurality of inter-blade platforms, each extending between two adjacent blades and defining an inner profile of a flow section for a fluid passing through the fan;
    wherein said adjacent blades present slides on their facing side faces, these slides being situated outside the disk and limiting outward radial movement of said platform, and wherein each of said platforms is a one-piece cylindrical element consisting entirely of a C-shaped section and comprises:
- an outer wall extending in a circumferential direction relative to the disk, the outer wall defining the inner profile of the flow section for the fluid passing through the fan,
- two side walls extending substantially in a radial direction, and
- two inner walls extending the side walls and being folded towards the middle of the platform, said inner walls extending in a circumferential direction relative to the disk without meeting each other, and wherein the inner walls rest on an outermost surface of the disk.

* * * * *